United States Patent
Seo et al.

(10) Patent No.: US 9,176,863 B2
(45) Date of Patent: Nov. 3, 2015

(54) MEMORY CONTROLLER CONTROLLING A NONVOLATILE MEMORY

(75) Inventors: Jeong-Beom Seo, Seoul (KR); Wonmoon Cheon, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 660 days.

(21) Appl. No.: 13/415,209

(22) Filed: Mar. 8, 2012

(65) Prior Publication Data

US 2012/0239862 A1    Sep. 20, 2012

(30) Foreign Application Priority Data

Mar. 15, 2011    (KR) .......................... 10-2011-023027

(51) Int. Cl.
  *G06F 12/10*  (2006.01)
  *G06F 12/02*  (2006.01)
  *G06F 3/06*   (2006.01)

(52) U.S. Cl.
  CPC ............ *G06F 12/0246* (2013.01); *G06F 3/067* (2013.01); *G06F 12/023* (2013.01); *G06F 2212/7202* (2013.01)

(58) Field of Classification Search
  CPC .............. G06F 12/023; G06F 12/0246; G06F 2212/7202; G06F 3/067
  USPC .......................................................... 711/170
  See application file for complete search history.

(56) References Cited

U.S. PATENT DOCUMENTS

| | | | |
|---|---|---|---|
| 7,689,761 B2 | 3/2010 | Yim et al. | |
| 2008/0172519 A1 | 7/2008 | Shmulevich et al. | |
| 2009/0193184 A1* | 7/2009 | Yu et al. | 711/103 |

FOREIGN PATENT DOCUMENTS

| | | |
|---|---|---|
| JP | 11-003287 | 1/1999 |
| JP | 2006-031106 | 2/2006 |
| KR | 1020070008403 | 1/2007 |

* cited by examiner

*Primary Examiner* — Jae Yu
(74) *Attorney, Agent, or Firm* — Ellsworth IP Group PLLC

(57) ABSTRACT

Described is a memory controller interfacing with a host and a nonvolatile memory. The memory controller may include a buffer unit configured to store an input address table and a first hot address table; and a processing unit configured to judge whether an address from the host coincides with one of addresses stored in the input address table and to store the address from the host in the first hot address table according to the judgment.

11 Claims, 18 Drawing Sheets

Fig. 3

| t | LBA |
|---|---|
| t1 | L24 |
| t2 | L9 |
| t3 | L10 |
| t4 | L11 |
| t5 | L12 |
| t6 | L13 |
| t7 | L24 |
| t8 | L1 |
| t9 | L3 |
| t10 | L2 |
| t11 | L9 |
| t12 | L10 |
| t13 | L11 |
| t14 | L12 |
| t15 | L26 |
| t16 | L14 |

Fig. 10

| t | LBA |
|---|---|
| t17 | L1 |
| t18 | L3 |
| t19 | L2 |
| t20 | L9 |
| t21 | L10 |
| t22 | L11 |
| t23 | L12 |

| Group | Count |
|-------|-------|
| G1 | VALUE1 |
| G2 | VALUE2 |
| G3 | VALUE3 |
| G4 | VALUE4 |
| G5 | VALUE5 |
| ⋮ | |
| Gm | VALUEm |
| | TVAL |

# MEMORY CONTROLLER CONTROLLING A NONVOLATILE MEMORY

CROSS-REFERENCE TO RELATED APPLICATIONS

This application claims the benefits, under 35 U.S.C §119, of Korean Patent Application No. 10-2011-0023027 filed Mar. 15, 2011, the entirety of which is incorporated by reference herein

BACKGROUND

1. Field

Exemplary embodiments of the general inventive concept relate to a memory system, and more particularly, relate to a memory controller controlling a nonvolatile memory device.

2. Description of the Related Art

A semiconductor memory device is a memory device which is fabricated using semiconductors such as silicon (Si), germanium (Ge), gallium arsenide (GaAs), indium phosphide (InP), and the like. Semiconductor memory devices are classified into volatile memory devices and nonvolatile memory devices.

The volatile memory devices may lose stored contents at power-off. The volatile memory devices may include a static RAM (SRAM), a dynamic RAM (DRAM), a synchronous DRAM (SDRAM), and the like. The nonvolatile memory devices may retain stored contents even at power-off. The nonvolatile memory devices may include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like. The flash memory device is roughly divided into a NOR type and a NAND type.

SUMMARY

An exemplary embodiment of the present general inventive concept is directed to providing a memory controller interfacing with a host and a nonvolatile memory. The memory controller may comprise a buffer unit configured to store an input address table and a first hot address table; and a processing unit configured to judge whether an address from the host coincides with one of addresses stored in the input address table and to store the address from the host in the first hot address table according to the judgment, wherein the processing unit stores the address from the host in the input address table according to a first-in first-out (FIFO) manner.

In this exemplary embodiment of the present general inventive concept, the processing unit may determine a type of the address from the host by determining the address from the host as a hot or cold address according to addresses stored in the first hot address table.

In this exemplary embodiment of the present general inventive concept, the nonvolatile memory may include a first area and a second area, and the processing unit may control the nonvolatile memory such that writing data input with the address from the host is selectively stored in the first and second areas, according to whether the address from the host is a hot address or a cold address.

In this exemplary embodiment of the present general inventive concept, the nonvolatile memory may include a first area and a second area, the processing unit may generate a physical block address corresponding to one of the first and second areas, according to whether the address from the host is a hot address or a cold address, and writing data input with the address from the host is stored in one of the first and second areas according to the physical block address.

In this exemplary embodiment of the present general inventive concept, the buffer unit may further include a second hot address table, and the processing unit may store the address from the host in the second hot address table when the address from the host coincides with one of addresses stored in the first hot address table.

In this exemplary embodiment of the present general inventive concept, if the address from the host coincides with one of addresses stored in the input address table, the processing unit may judge whether the address from the host coincides with one of addresses stored in the first hot address table.

In this exemplary embodiment of the present general inventive concept, the processing unit may store the address from the host in the first hot address table according to the FIFO manner, and the processing unit may store the address from the host in the second hot address table according to the FIFO manner.

In this exemplary embodiment of the present general inventive concept, the nonvolatile memory may include a first area and a second area, the processing unit may determine the address from the host as a hot or cold address according to addresses stored in the second hot address table, and the processing unit may control the nonvolatile memory such that writing data input with the address from the host is selectively stored in the first and second areas, according to the determination.

In this exemplary embodiment of the present general inventive concept, the processing unit may determine a type of the address from the host based upon the first and second hot address tables. If the address from the host coincides with at least one of addresses stored in the second hot address table, the processing unit may determine the type of the address from the host by determining the address from the host as a first hot address. If the address from the host coincides with at least one of addresses stored in the first hot address table, not the second hot address table, the processing unit may determine the type of the address from the host by determining the address from the host as a second hot address. If the address from the host does not coincide with at least one of addresses stored in the first and second hot address tables, the processing unit may determine the type of the address from the host by determining the address from the host as a cold address.

In this embodiment of the present general inventive concept, the nonvolatile memory may include a first to a third area, and the processing unit controls the nonvolatile memory such that writing data input with the address from the host is selectively stored in the first to third areas.

Further, the address from the host may be received at a write operation.

Another exemplary embodiment of the present general inventive concept is directed to a memory controller interfacing with a host and a nonvolatile memory. The memory controller may comprise a buffer unit configured to store a count table including count values corresponding to a plurality of address groups, the plurality of address groups being classified according to addresses input from the host; and a processing unit configured to search an address group, including the address from the host, in the count table and to control the buffer unit such that a count value corresponding to the searched address group increases, wherein a type of the address from the host is judged according to the count values.

In this exemplary embodiment of the present general inventive concept, the processing unit may control the nonvolatile memory such that writing data input with the address from the host is stored in the nonvolatile memory according to the judged type.

In this exemplary embodiment of the present general inventive concept, the processing unit may judge the type of the address from the host by comparing a count value corresponding to the searched address group with a threshold count value.

In this exemplary embodiment of the present general inventive concept, the buffer unit may further store a total count value, the total count value increases whenever a write operation is requested, the threshold count value is determined according to the total count value, and the threshold count value increases in proportion to an increase in the total count value.

In this embodiment of the general inventive concept, the buffer unit may further store a total count value, the total count value increases whenever a write operation is requested and the threshold count value is fixed, and the processing unit initializes the count table when the total count value reaches a specific count value.

Another exemplary embodiment of the present general inventive concept is directed to a memory controller interfacing with a host and a nonvolatile memory. The memory controller may comprise a buffer unit configured to store an address table; a processing unit configured to categorize an address received from the host and to store the categorized address in the address table based on the categorization of the received address.

In this exemplary embodiment of the present general inventive concept, the address table of the buffer unit may include an input address table and a first hot address table. Further, the received address may be stored in the only input address table or in both the input address table and the first hot address table, based on the categorization of the received address by the processing unit.

In this exemplary embodiment of the present general inventive concept, the processing unit may categorize the received address as a cold address or a hot address. For example, the received address may be categorized as a hot address if the received address coincides with an address stored in the input address table. Similarly, the received address may be categorized as a cold address if the received address does not coincide with an address stored in the input address table.

In this exemplary embodiment of the present general inventive concept, the received address categorized as a cold address may be stored in only in the input address table, and the received address categorized as a hot address may be stored in both the input address table and the first hot address table.

In this exemplary embodiment of the present general inventive concept, the nonvolatile memory may include a first area and a second area, and writing data input with the received address may be selectively stored in the first and second areas according to the categorization of the received address by the processing unit.

In this exemplary embodiment of the present general inventive concept, the address table of the buffer unit may further include a second hot address table. Further, the received address may be stored in: (1) only the input address table, (2) the input address table and the first hot address table, or (3) the input address table, the first hot address table and the second hot address table, based on the categorization of the received address by the processing unit.

In this exemplary embodiment of the present general inventive concept, the processing unit may categorize the received address as a cold address, a first hot address, or a second hot address. For example, the received address may be categorized as a cold address if the received address does not coincide with an address stored in the input address table. The received address may be categorized as a first hot address if the received address coincides with an address stored in the input address table. Similarly, the received address may be categorized as a second hot address if the received address coincides with an address stored in both the input address table and the first hot address table.

In this exemplary embodiment of the present general inventive concept, the received address categorized as a cold address may be stored in only in the input address table, the received address categorized as a first hot address may be stored in both the input address table and the first hot address table, and the received address categorized as a second hot address may be stored in the input address table, the first hot address table and the second hot address table.

In this exemplary embodiment of the present general inventive concept, the nonvolatile memory may include a first area, a second area and a third area. Further, the writing data input with the received address may be selectively stored in the first, second and third areas according to the categorization of the received address by the processing unit.

Additional features and utilities of the present general inventive concept will be set forth in part in the description which follows and, in part, will be obvious from the description, or may be learned by practice of the general inventive concept.

BRIEF DESCRIPTION OF THE DRAWINGS

The above and other features and utilities of the present general inventive concept will become apparent and more readily appreciated from the following description with reference to the following figures, wherein like reference numerals refer to like parts throughout the various figures unless otherwise specified.

FIG. 3 is a diagram illustrating logical block addresses input to a memory controller at 1st to 16th write requests.

FIG. 10 is a diagram illustrating logical block addresses input to a memory controller at write requests.

FIG. 16 is a diagram illustrating a count table in FIG. 14.

DETAILED DESCRIPTION OF THE EXEMPLARY EMBODIMENTS

Figure 1:
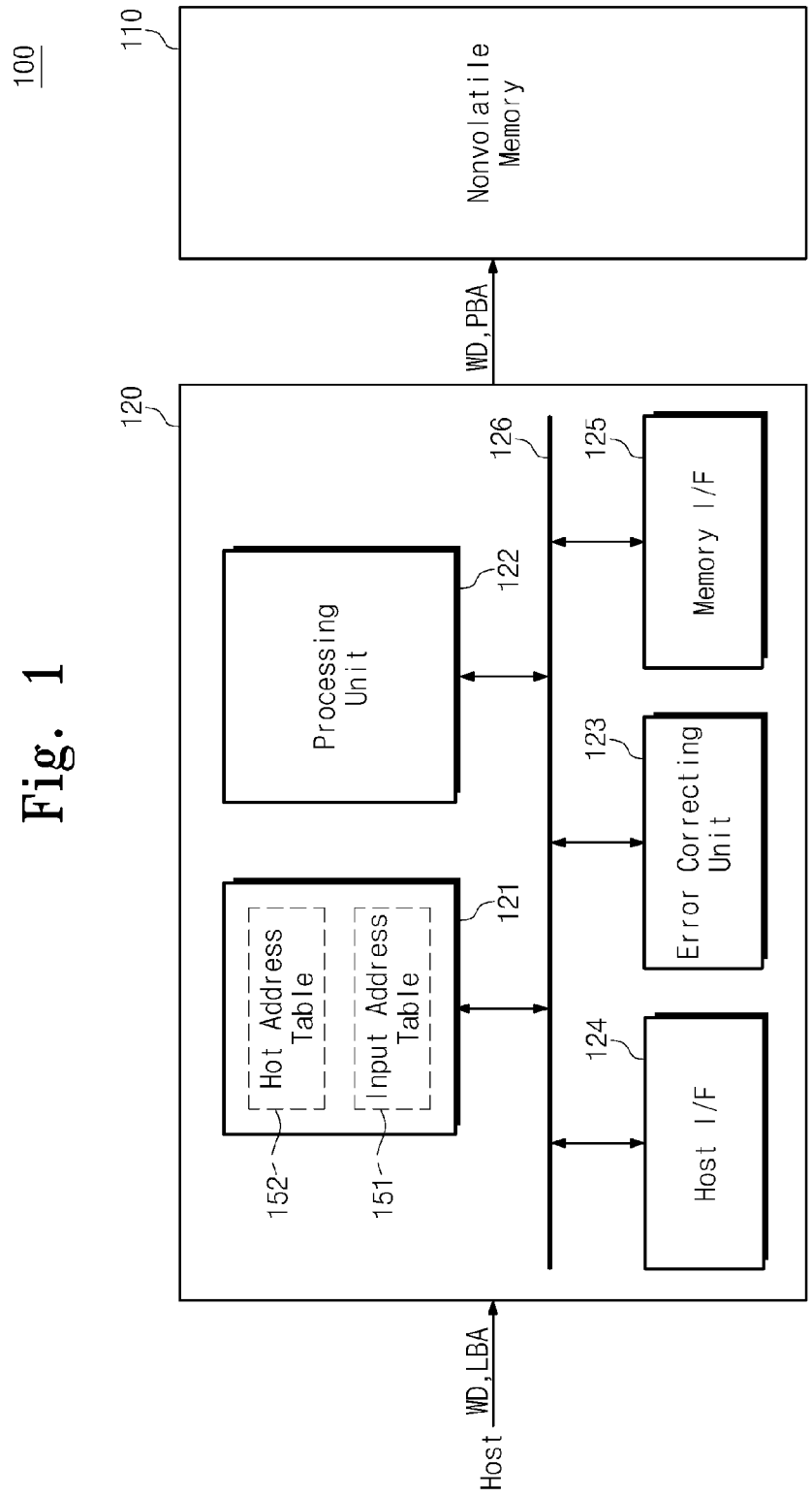
FIG. 1 is a block diagram illustrating a memory system according to an exemplary embodiment of the present general inventive concept.

The present general inventive concept is described more fully hereinafter with reference to the accompanying drawings, in which exemplary embodiments of the present general inventive concept are shown. This inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a memory system according to an exemplary embodiment of the present general inventive concept. Referring to FIG. 1, a memory system 100 includes a nonvolatile memory 110 and a memory controller 120.

The nonvolatile memory 110 is coupled with the memory controller 120. For example, the nonvolatile memory 110 may be coupled with the memory controller 120 via one channel. The nonvolatile memory 110 may include a plurality of memory blocks (refer to FIG. 7). Each memory block is formed of a plurality of pages (not shown). Each page includes a plurality of memory cells (not shown). A NAND flash memory performs a read/program operation by the page and an erase operation by the memory block. In the event that a page to be erased is marked to be invalid, data of the invalidation-marked page may be treated as invalid data.

At a write operation, the nonvolatile memory 110 receives writing data WD and a physical block address PBA from the memory controller 120. The nonvolatile memory 110 may program the writing data at a page corresponding to the input physical block address. Exemplarily, threshold voltages of memory cells may be varied by applying a specific voltage to memory cells in a selected page. Variations of threshold voltages of memory cells in the selected page allow for data to be stored in the selected page.

The memory controller 120 interfaces with a host and the nonvolatile memory 110. The memory controller 120 receives writing data and a logical block address LBA from the host. The memory controller 120 converts the input logical block address LBA into a physical block address PBA to send it to the nonvolatile memory 110 with the writing data.

The memory controller 120 includes a buffer unit 121, a processing unit 122, an error correcting unit 123, a host interface 124, a memory interface 125, and a bus 126.

The buffer unit 121 stores an input address table 151 and a hot address table 152. The input address table 151 stores a logical block address LBA input whenever a write operation is performed, in a First-In First-Out (FIFO) manner. For example, the input address table 151 is configured to store logical block addresses by a predetermined number.

The hot address table 152 stores logical block addresses judged to be a hot address. A type of a logical block address LBA input from the host is judged based upon logical block addresses stored in the hot address table 152.

The hot address table 152 is configured to store logical block addresses in the FIFO manner. A logical block address LBA input at a write operation is compared with logical block addresses of the input address table 151, respectively. If a logical block address LBA input from the host is identical to at least one of logical block addresses of the input address table 151, the identical logical block address LBA may be stored in the hot address table 152.

The buffer unit 121 is formed of a random access memory (RAM) such as an SRAM or a DRAM. The buffer unit 121 may be used as at least one of a working memory of the processing unit 122 or a buffer memory between the nonvolatile memory 110 and the host.

The processing unit 122 controls an overall operation of the memory controller 120. The processing unit 122 is configured to control a background operation of the nonvolatile memory 110. For example, the processing unit 122 controls the nonvolatile memory 110 such that the merge and garbage collection are made.

The processing unit 122 is coupled with the buffer unit 121, the error correcting unit 123, the host interface 124, and the memory interface 125 via the bus 126.

The processing unit 122 determines a type of a logical block address LBA input form a host at a write operation based upon the hot address table 152. For example, the processing unit 122 judges whether a logical block address LBA input form a host is identical to at least one of logical block addresses stored in the hot address table 152, and determines a type of the logical block address LBA input form the host.

If the hot address table 152 includes a logical block address identical to a logical block address LBA input form a host, the logical block address LBA input form the host is judged to be a hot address. In this case, writing data WD input with the logical block address LBA may be hot data. A hot address is a logical block address frequently accessed by the host, and hot data is writing data frequently updated thereby.

If the hot address table 152 does not include a logical block address identical to a logical block address LBA input form a host, the logical block address LBA input form the host is judged to be a cold address. In this case, writing data WD input with the logical block address LBA may be cold data. A cold address is a logical block address occasionally accessed by the host, and cold data is writing data which is not frequently updated by the host.

Upon a write operation, the processing unit 122 judges whether a logical block address LBA input form a host is identical to at least one of the logical block addresses in the input address table 151. If a logical block address LBA input form a host is identical to at least one of the logical block addresses in the input address table 151, the processing unit 122 stores the identical logical block address LBA in the hot address table 152.

Additionally, upon a write operation, the processing unit 122 stores a logical block address LBA input from the host in the input address table 151. The storing of the logical block address LBA in the input address table 151 is performed in the FIFO manner.

The error correcting unit 123 detects and corrects erroneous bits of data read from the nonvolatile memory 110 using an error correcting code (ECC). The error-corrected data may be sent to the host.

The host interface 124 includes the data exchange protocol between the host and the memory controller 120. The host interface 124 transfers a logical block address LBA and writing data WD input from the host to the processing unit 122 or the buffer unit 121 via the bus 126.

The host interface 124 includes the protocol for executing data exchange between the host and the memory controller 120. Exemplarily, the host interface 124 may communicate with an external device (e.g., the host) via at least one of various protocols such as an USB (Universal Serial Bus) protocol, an MMC (multimedia card) protocol, a PCI (peripheral component interconnection) protocol, a PCI-E (PCI-express) protocol, an ATA (Advanced Technology Attachment) protocol, a Serial-ATA protocol, a Parallel-ATA protocol, a SCSI (small computer small interface) protocol, an ESDI (enhanced small disk interface) protocol, and an IDE (Integrated Drive Electronics) protocol. The host interface 124 may also communicate with the host using a proprietary interface instead of the above-described protocols. Moreover, the host interface 124 may communicate with an external device (e.g., the host) via at least one of various wireless protocols such as, for example, WiFi, Bluetooth, GSM, LTE, CDMA, Infrared, etc.

The memory interface 125 interfaces with the nonvolatile memory 110. For example the memory interface 125 includes a NAND interface or a NOR interface.

The bus 126 provides at least one channel which is configured to couple the buffer unit 121, the processing unit 122, the error correcting unit 123, the host interface 124, and the memory interface 125.

The controller 120 and the nonvolatile memory 110 may be integrated in a single semiconductor device to form, for example, a memory card. Examples of the memory card include, for example, a PC (PCMCIA) card, a CF card, an SM (or SMC) card, a memory stick, a multimedia card (MMC, RS-MMC, MMCmicro), a security card (SD, miniSD, microSD, SDHC), a universal flash storage (UFS) device, or the like.

The controller 120 and the nonvolatile memory 110 may be integrated in a single semiconductor device to form, for example, a solid state drive (SSD). The SSD includes a storage device configured to store data in a semiconductor memory. By using the memory system 100 as the SSD, it is possible to remarkably improve an operating speed of a host coupled with the memory system 100.

In some exemplary embodiments of the general inventive concept, the memory system 100 may be used as, for example, a computer, a portable computer, an Ultra Mobile PC (UMPC), a workstation, a net-book, a PDA, a web tablet, a wireless phone, a mobile phone, a smart phone, an e-book, a PMP (portable multimedia player), a digital camera, a digital audio recorder/player, a digital picture/video recorder/player, a digital picture/video frame, a portable game machine, a navigation system, a black box, a 3-dimensional television, a device capable of transmitting and receiving information at a wireless circumstance, one of various electronic devices constituting home network, one of various electronic devices constituting computer network, one of various electronic devices constituting telematics network, RFID, or one of various electronic devices constituting a computing system.

In some exemplary embodiments of the present general inventive concept, the memory system 100 may be packed by various types of packages that may include, for example, PoP (Package on Package), Ball grid arrays (BGAs), Chip scale packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The memory controller 120 according to an exemplary embodiment of the present general inventive concept includes not only the input address table 151, but also the hot address table 152. In operation, the memory controller 120 may classify a logical block address LBA from a host into a hot address and a cold address based upon the hot address table 152 while not referencing the input address table 151. Further, logical block addresses input at plural write operations may be considered.

Figure 2:
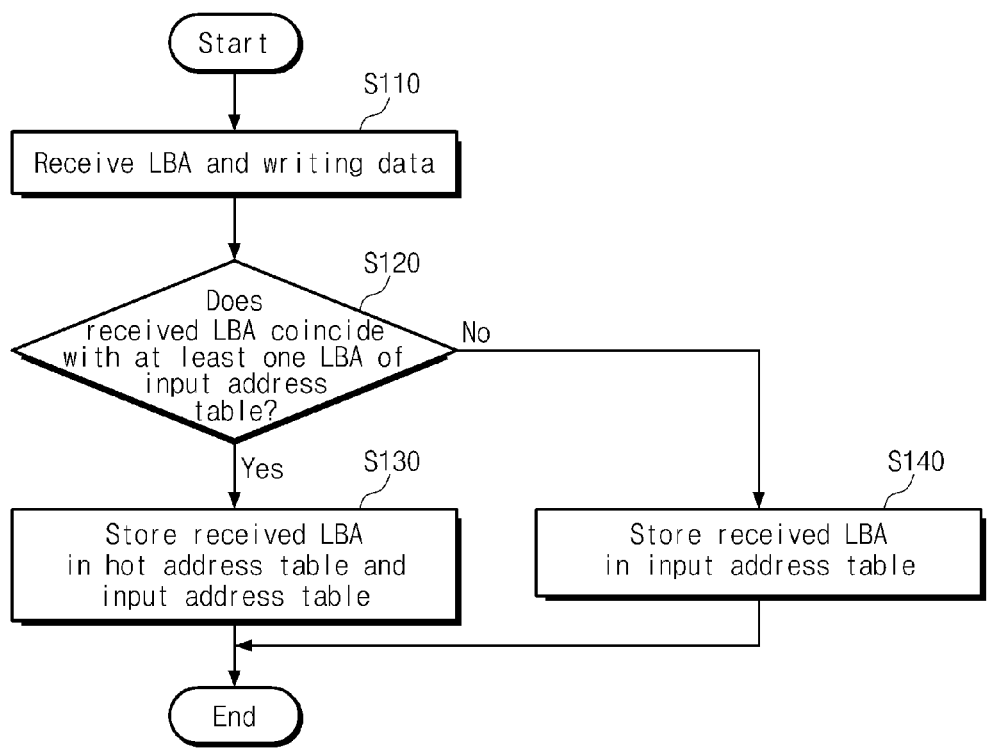
FIG. 2 is a flowchart for describing a table managing method of a memory controller in FIG. 1

FIG. 2 is a flowchart for describing a table managing method of a memory controller in FIG. 1. Referring to FIGS. 1 and 2, in operation S110, a memory controller 120 receives a logical block address LBA and writing data WD from a host.

In operation S120, a processing unit 122 judges whether an input address block 151 includes at least one logical block address identical to the input logical block address LBA. Operations S130 and S140 are selectively performed according to the judgment.

In operation S130, the processing unit 122 stores the input logical block address LBA in a hot address table 152. Further, the processing unit 122 stores the input logical block address LBA in a cold address table 151.

In operation S140, the processing unit 122 stores the input logical block address LBA in the input address table 152.

Figure 4:
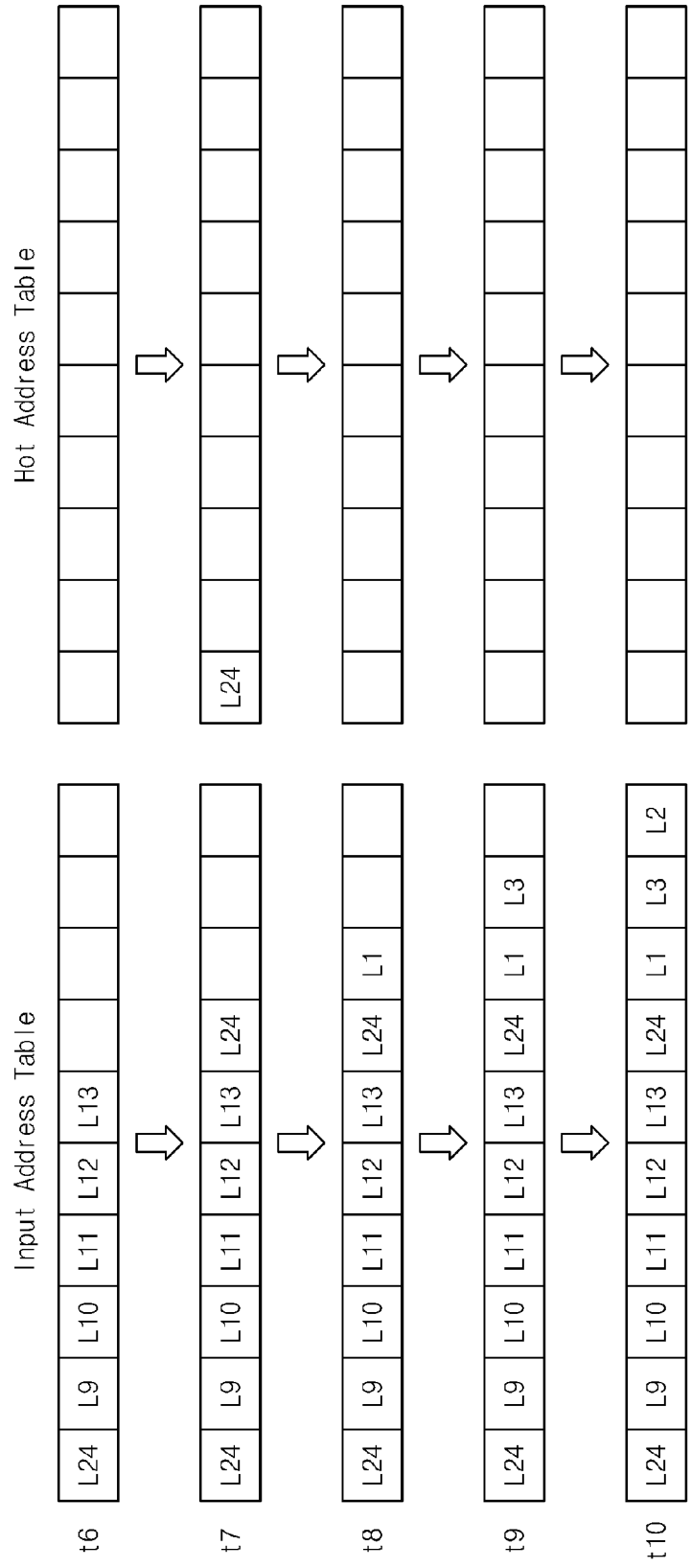
FIGS. 4 and 5 are diagrams illustrating input and hot address tables updated at 1st to 16th write requests.
Figure 5:
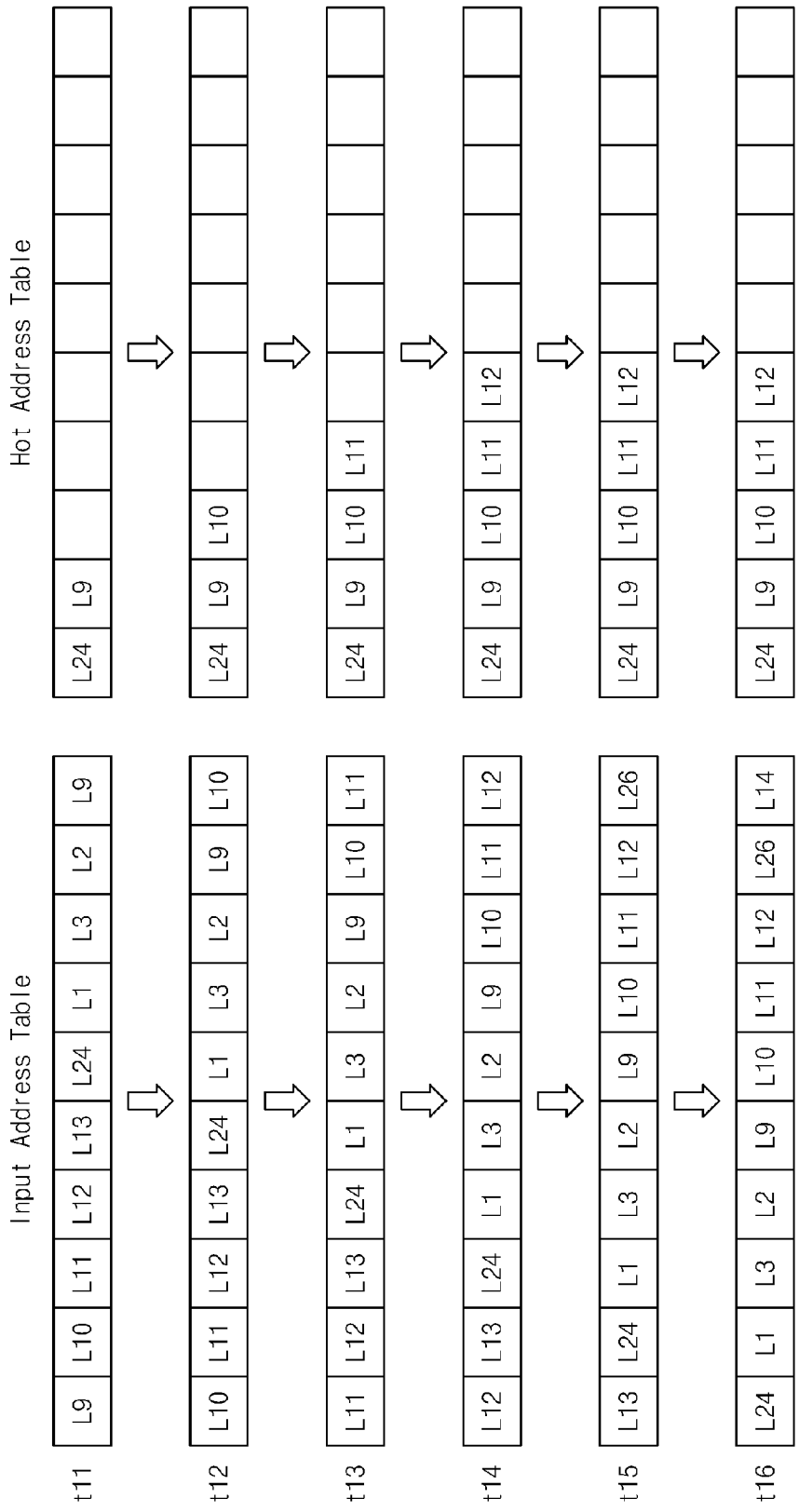

FIG. 3 is a diagram illustrating logical block addresses input to a memory controller at $1^{st}$ to $16^{th}$ write requests. FIGS. 4 and 5 are diagrams illustrating input and hot address tables updated at $1^{st}$ to $16^{th}$ write requests. In FIGS. 4 and 5, an input address table 151 and a hot address table 152 are exemplarily illustrated to store ten logical block addresses. However, it is well understood that the input address table 151 and the hot address table 152 are configured to store more logical block addresses.

Referring to FIGS. 3 to 5, logical block addresses L24, L9, L10, L11, L12, and L13 input respectively at $1^{st}$ to $6^{th}$ write requests t1 to t6 are stored sequentially in the input address table 151.

As illustrated in FIG. 3, a logical block address L24 is received at a $7^{th}$ write request t7. There is judged whether the logical block address L24 coincides with at least one of logical block addresses in the input address table 151. If at least one logical block address identical to the input logical block address L24 is included in the input address table 151, the input logical block address L24 is stored in the input address table 151 and the hot address table 152.

As understood from FIG. 3, logical block addresses L1, L3, and L2 input at $8^{th}$ to $10^{th}$ write requests t8 to t10 don't coincide with at least one of logical block addresses in the input address table 151. In this case, the logical block addresses L1, L3, and L2 are stored sequentially in the input address table 151.

Each of logical block addresses L9, L10, L11, and L12 input at $11^{th}$ to $14^{th}$ write requests t11 to t14 coincides with at least one of logical block addresses in the input address table 151. In this case, the logical block addresses L9, L10, L11, and L12 are stored in both the input address table 151 and the hot address table 152.

As understood from FIG. 3, logical block addresses L26 and L14 input at $15^{th}$ and $16^{th}$ write requests t15 to t16 don't coincide with at least one of logical block addresses in the input address table 151. In this case, the logical block addresses L26 and L14 are stored sequentially in the input address table 151.

Whether a logical block address LBA input from a host is a hot address may be judged based upon logical block addresses L24, L9, L10, L11, and L12 stored in the hot address table 152.

Figure 6:
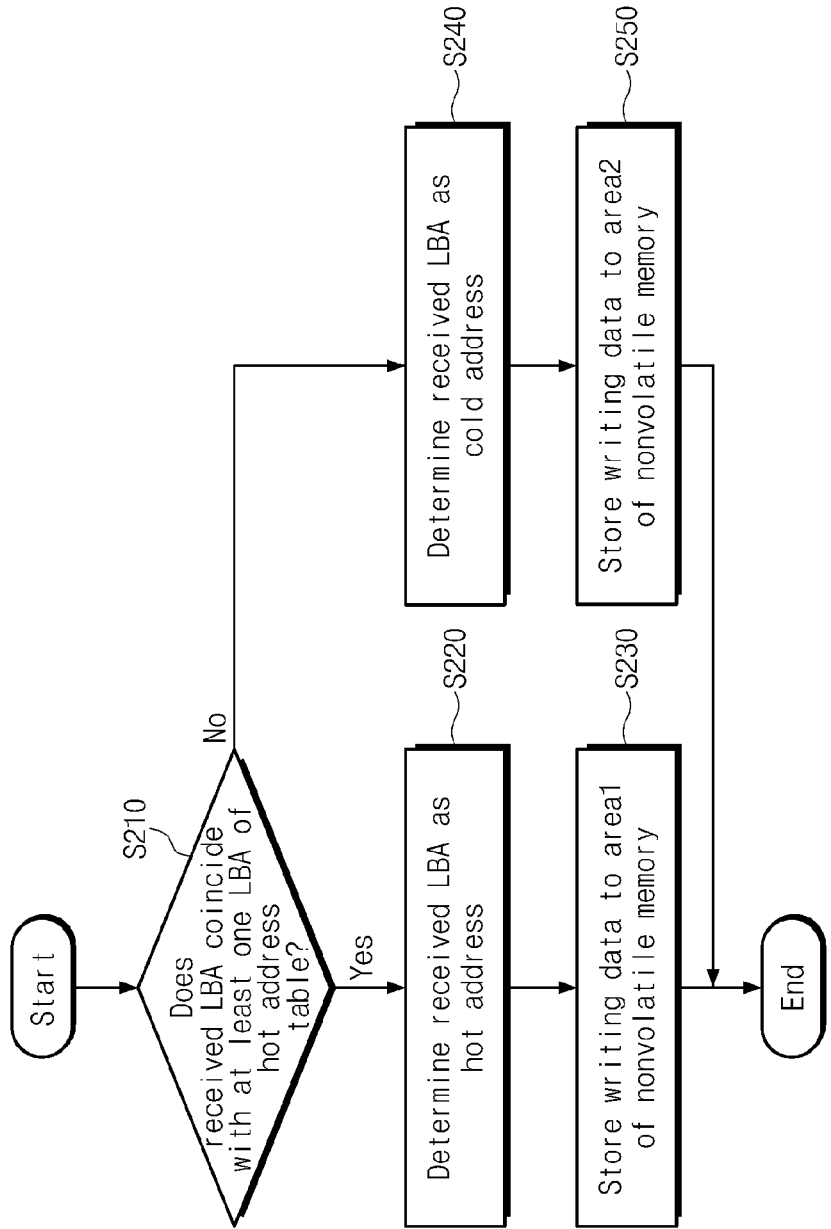
FIG. 6 is a flowchart for describing a method of judging a type of a logical block address input from a host in FIG. 1.
Figure 7:
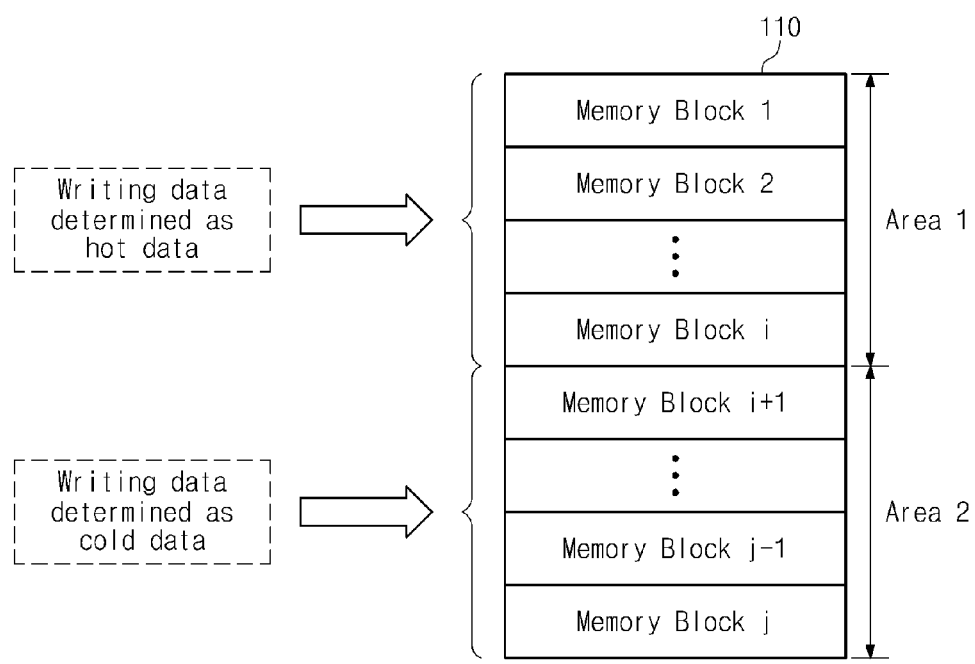
FIG. 7 is a diagram for describing a method of storing writing data in a nonvolatile memory according to an address type judged in FIG. 6.

FIG. 6 is a flowchart for describing a method of judging a type of a logical block address input from a host in FIG. 1. FIG. 7 is a diagram for describing a method of storing writing data in a nonvolatile memory according to an address type judged in FIG. 6. In FIG. 7, there is exemplarily illustrated nonvolatile memory 110 that includes a first area Area1 and a second area Area2. After a type of a logical block address LBA input from a host is judged according to a method in FIG. 1, the logical block address LBA is stored in at least one of an input address table 151 or a hot address table 152.

FIGS. 1, 6, and 7, in operation S210, a processing unit 122 judges whether a logical block address LBA input from a host coincides with at least one logical block address in a hot address table 152. Operations S220 and S240 are selectively performed according to the judgment. If the processing unit 122 judges that a logical block address LBA input from a host coincides with at least one logical block address in a hot address table 152 (Yes at Operation S210), the method proceeds to Operation S220. Alternatively, if the processing unit 122 judges that the logical block address LBA input from a host does not coincide with at least one logical block address in a hot address table 152 (No at Operation S210), the method proceeds to Operation S240.

In operation S220, the processing unit 122 categorizes the input logical block address LBA as a hot address. At this time, writing data WD input with the logical block address LBA may be hot data. In operation S230, the writing data WD is stored in a first area Area1 of a nonvolatile memory 110.

In operation S240, the processing unit 122 categorizes the input logical block address LBA as a cold address. At this time, writing data WD input with the logical block address LBA may be cold data. In operation S250, the writing data WD is stored in a second area Area2 of the nonvolatile memory 110.

The processing unit 122 may determine a type of a logical block address LBA input according to logical block addresses in the hot address table 152. Writing data WD may be stored in the nonvolatile memory 110 according to the determined type.

The processing unit 122 may perform a flash translation layer (FTL) function and translates a logical block address input from a host into a physical block address PBA. Further, the processing unit 122 manages a mapping table which stores a mapping relationship between logical block addresses and physical block addresses. The mapping table is stored in a buffer unit 121 under the control of the processing unit 122.

The processing unit 122 may determine a value of a physical block address PBA according to whether a logical block address LBA input from a host is a hot address or a cold address. If the input logical block address LBA is a hot address, the processing unit 122 generates a physical block address PBA corresponding to a first area Area1 of the nonvolatile memory 110. If the input logical block address LBA is a cold address, the processing unit 122 generates a physical block address PBA corresponding to a second area Area2 of the nonvolatile memory 110. That is, hot data and cold data may be stored in the first and second areas Area1 and Area2 of the nonvolatile memory 110, respectively, based on whether the LBA input from the host is a hot or cold address.

As discussed above, a write operation is performed by the page. In operation, a page in the first area Area1 may be marked to be invalid, thereby causing the writing data to be written in another page of the first area Area1. With respect to the second area Area2, pages are less frequently marked to be invalid, and therefore, the writing data is less often written in another page of the second area Area2. Accordingly, a merge or garbage collection operation is more often required with respect to the first area Area1. In contrast with the case where writing data is stored without dividing into the first and second areas Area1 and Area2, the number of required merge or garbage collection operations may be reduced by having the hot data and cold data being stored in the first area Area1 and the second area Area2, respectively.

Figure 8:
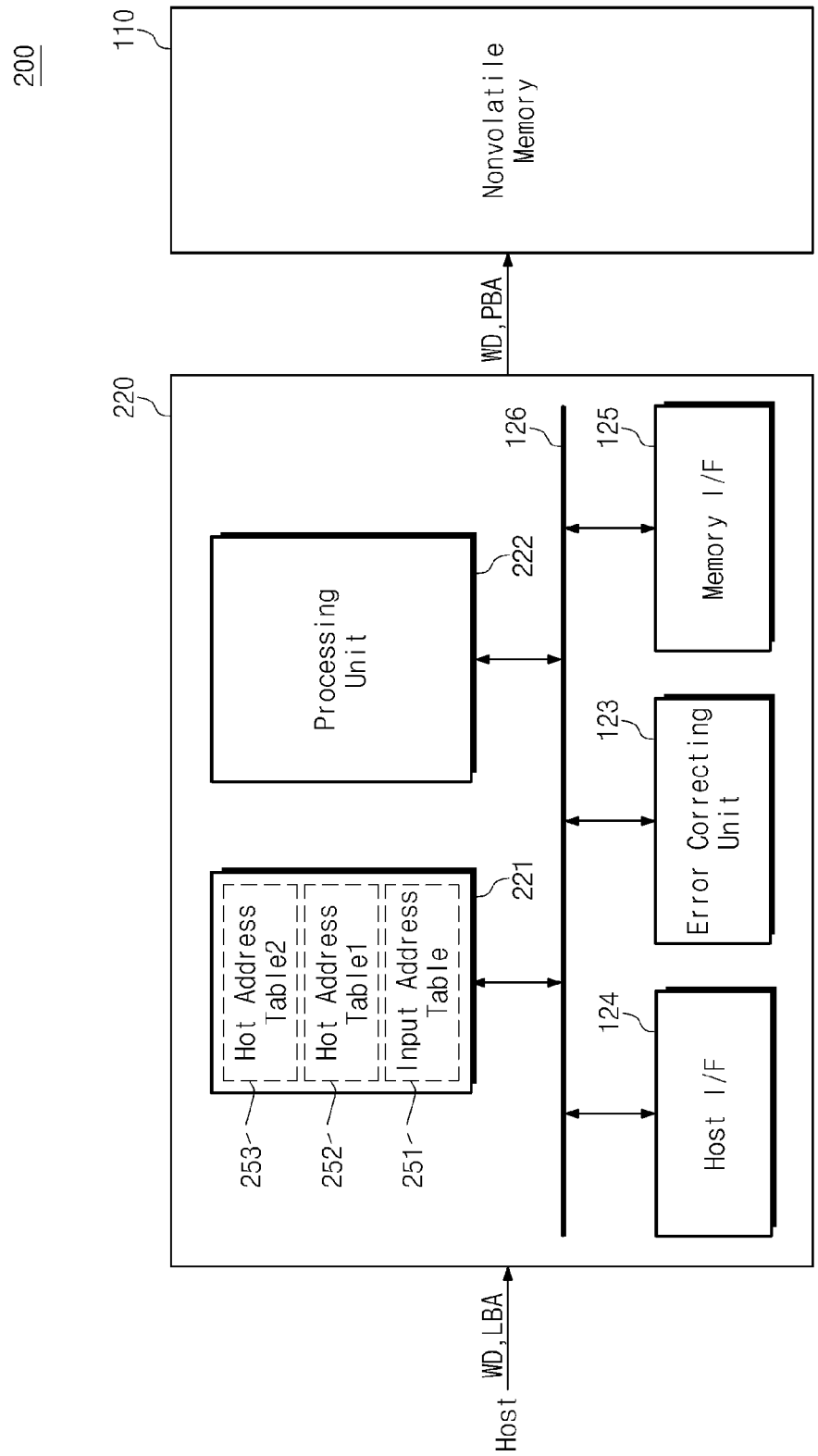
FIG. 8 is a block diagram illustrating a memory system according to another exemplary embodiment of the present general inventive concept.

FIG. 8 is a block diagram illustrating a memory system according to another exemplary embodiment of the inventive concept. Referring to FIG. 8, a nonvolatile memory 110 is configured the same as that in FIG. 1. A memory controller 220 is identical to that in FIG. 1 except for a processing unit 222 and a buffer unit 221, and therefore the identical description has been omitted.

The buffer unit 221 stores an input address table 251 and first and second hot address tables 252 and 253. Logical block addresses may be stored in the tables 251, 252, and 253 in a FIFO manner.

The processing unit 222 judges a type of a logical block address LBA input from a host according to logical block addresses in the first and second hot address tables 252 and 253 at a write operation. An area of the nonvolatile memory 110 where writing data WD is to be stored may be determined according to the judgment by the processing unit 222.

The processing unit 222 judges whether a logical block address LBA input from a host at a write operation coincides with at least one of logical block addresses in the first hot address table 252. If the logical block address LBA input from the host coincides with at least one of logical block addresses in the first hot address table 252, the processing unit 222 stores the input logical block address LBA in the second hot address table 252.

The processing unit 222 judges whether a logical block address LBA input from a host at a write operation coincides with at least one of logical block addresses in the input address table 251. If the logical block address LBA input from the host coincides with at least one of logical block addresses in the input address table 251, the processing unit 222 stores the input logical block address LBA in the first hot address table 252.

The processing unit 222 stores a logical block address LBA input from a host at a write operation in the input address table 251.

The buffer unit 221 storing two hot address tables 252 and 253 is exemplarily illustrated in FIG. 8. However, the present general inventive concept is not limited thereto. The buffer unit 221 may store more hot address tables. In this case, when a logical block address LBA input from a host coincides with at least one of logical block addresses in the input address table 251, the logical block address LBA input from the host may be stored in the lowest hot address table of the hot address tables. Further, the processing unit 222 detects a hot address table including a logical block address identical to that input from the host, and stores the logical block address LBA in a hot address table (hereinafter, referred to as an upper hot address table) placed at a high position of the detected hot address table. For example, the second hot address table 253 is an upper hot address table of the first hot address table 252.

Figure 9:
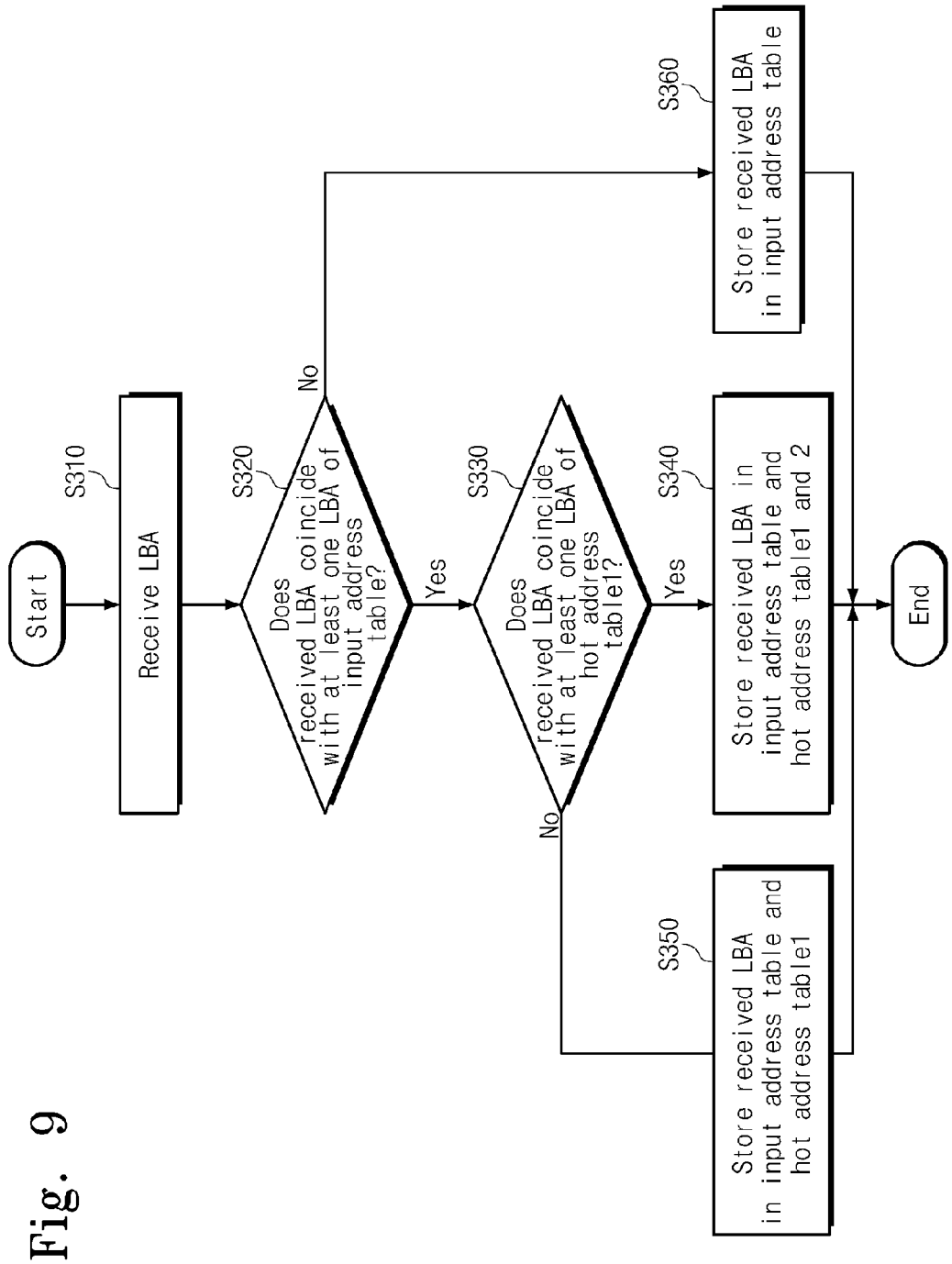
FIG. 9 is a flowchart of describing a table managing method of a memory controller in FIG. 8.

FIG. 9 is a flowchart of describing a table managing method of a memory controller in FIG. 8. Referring to FIGS. 8 and 9, in operation S310, a logical block address LBA is received from a host.

In operation S320, a processing unit 222 judges whether the input logical block address LBA coincides with at least one logical block address in an input address table 251. If the input logical block address LBA coincides with at least one logical block address in the input address table 251, the method proceeds to operation S330. If the input logical block address LBA does not coincide with at least one logical block address in the input address table 251, the method proceeds to operation S360.

In operation S330, the processing unit 222 judges whether the input logical block address LBA coincides with at least one logical block address in a first hot address table 252. The processing unit 222 compares the input logical block address LBA with logical blocks addresses in the input address table 251, and then compares the input logical block address LBA with logical blocks addresses in the first hot address table 252. If the input logical block address LBA exists within both the input address table 251 and the first hot address table 252, the method proceeds to operation S340. If the input logical block address LBA exists within the input address table 251, the method proceeds to operation S350.

In operation S340, the processing unit 222 stores the input logical block address LBA in the input address table 251 and the first and second hot address tables 252 and 253, respectively. In operation S350, the processing unit 222 stores the input logical block address LBA in the input address table 251 and the first hot address table 252, respectively. In operation S360, the processing unit 222 stores the input logical block address LBA in the input address table 251.

Figure 11:
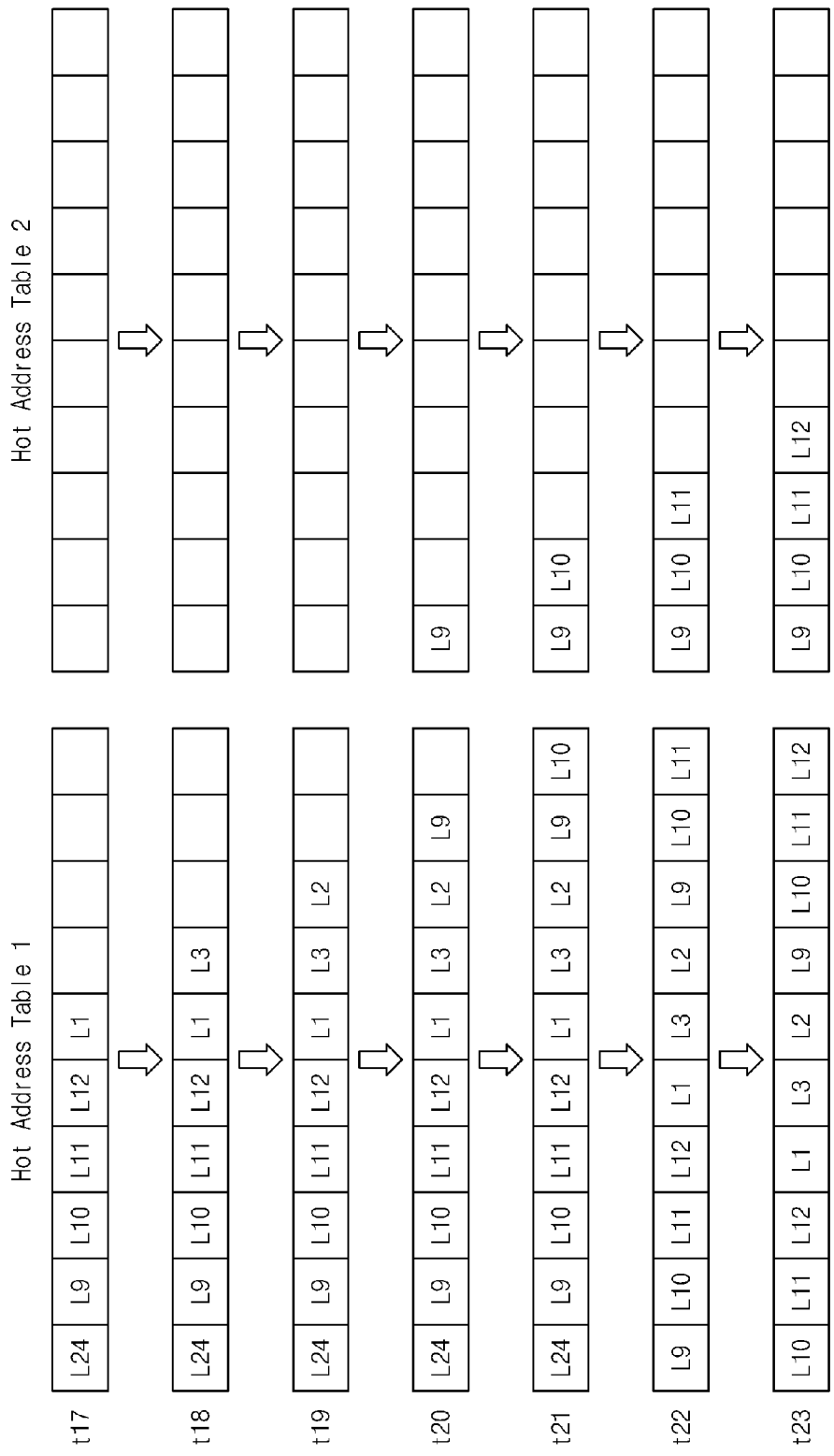
FIG. 11 is a diagram illustrating first and second hot address tables updated at write requests.

FIG. 10 is a diagram illustrating logical block addresses input to a memory controller at write requests. FIG. 11 is a diagram illustrating first and second hot address tables updated at write requests. $17^{th}$ to $23^{rd}$ write requests t17 to t23 in FIGS. 10 and 11 follow $1^{st}$ to $16^{th}$ write requests t1 to t16 in FIG. 3.

Referring to FIGS. 10 and 11, each of logical block addresses L1, L3, and L2 input from a host at the $17^{th}$ to $19^{th}$ write requests t17 to t19 coincides with one of logical block addresses in an input address table. At the $17^{th}$ to $19^{th}$ write requests t17 to t19, each of the logical block addresses L1, L3, and L2 does not coincide with logical block addresses in a first hot address table 252. Accordingly, the logical block addresses L1, L3, and L2 input at the $17^{th}$ to $19^{th}$ write requests t17 to t19 are stored in the first hot address table 252.

Each of logical block addresses L9, L10, L11, and L12 input from the host at the $20^{th}$ to $23^{rd}$ write requests t20 to t23 coincides with one of logical block addresses in an input address table. At the $20^{th}$ to $23^{rd}$ write requests t20 to t23, each of the logical block addresses L9, L10, L11, and L12 coincides with one of logical block addresses in the first hot address table 252. Accordingly, the logical block addresses L9, L10, L11, and L12 input at the $20^{th}$ to $23^{rd}$ write requests t20 to t23 are stored in the first and second hot address tables 252 and 253.

As described in FIGS. 10 and 11, the first hot address table 252 is updated when a logical block address LBA input from a host coincides with one of logical block addresses in the input address table 251. The second hot address table 253 is updated when a logical block address LBA input from a host coincides with one of logical block addresses in the first hot address table 252.

Figure 12:
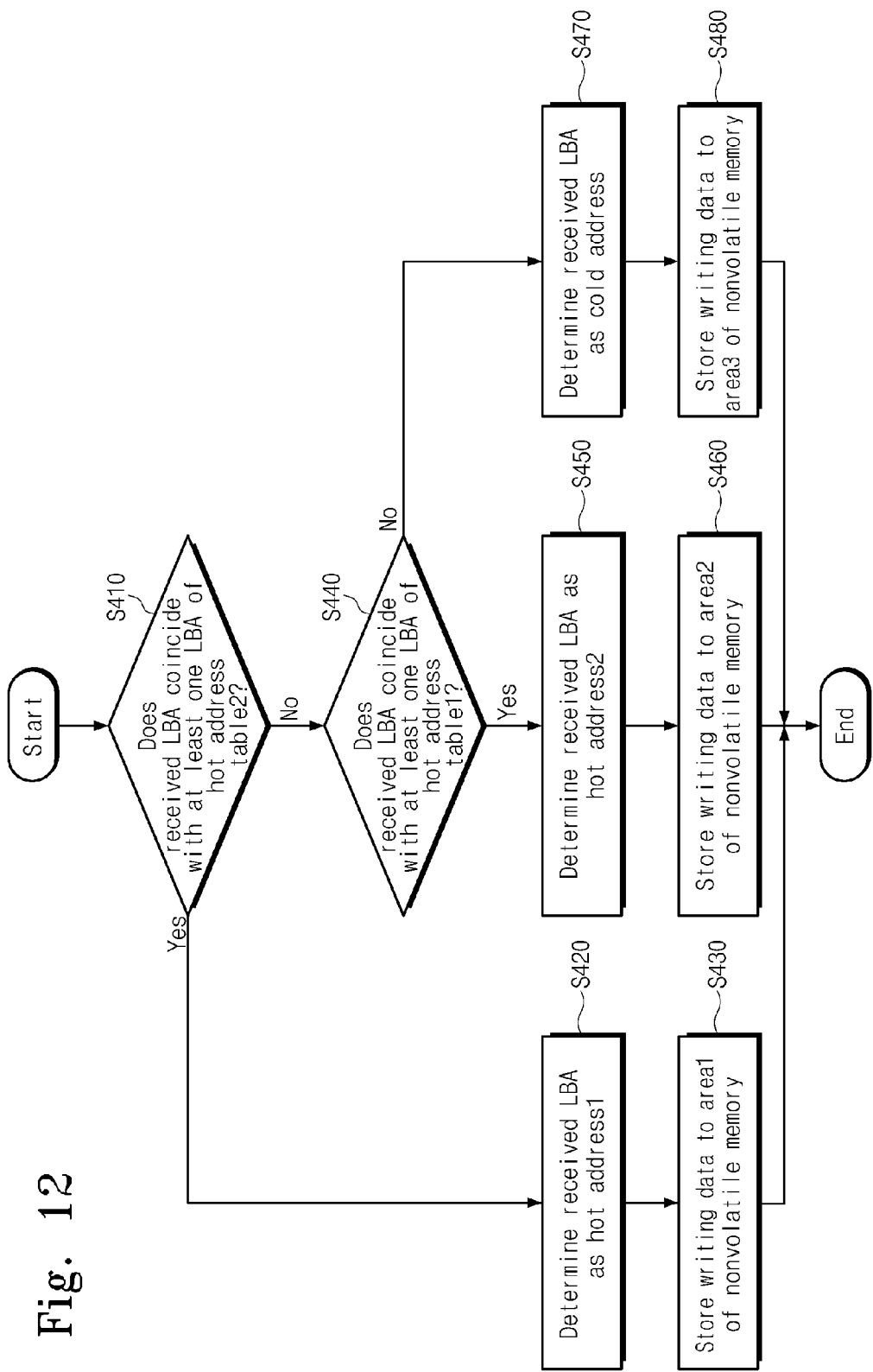
FIG. 12 is a flowchart for describing a method of judging a type of a logical block address input from a host in FIG. 8.
Figure 13:
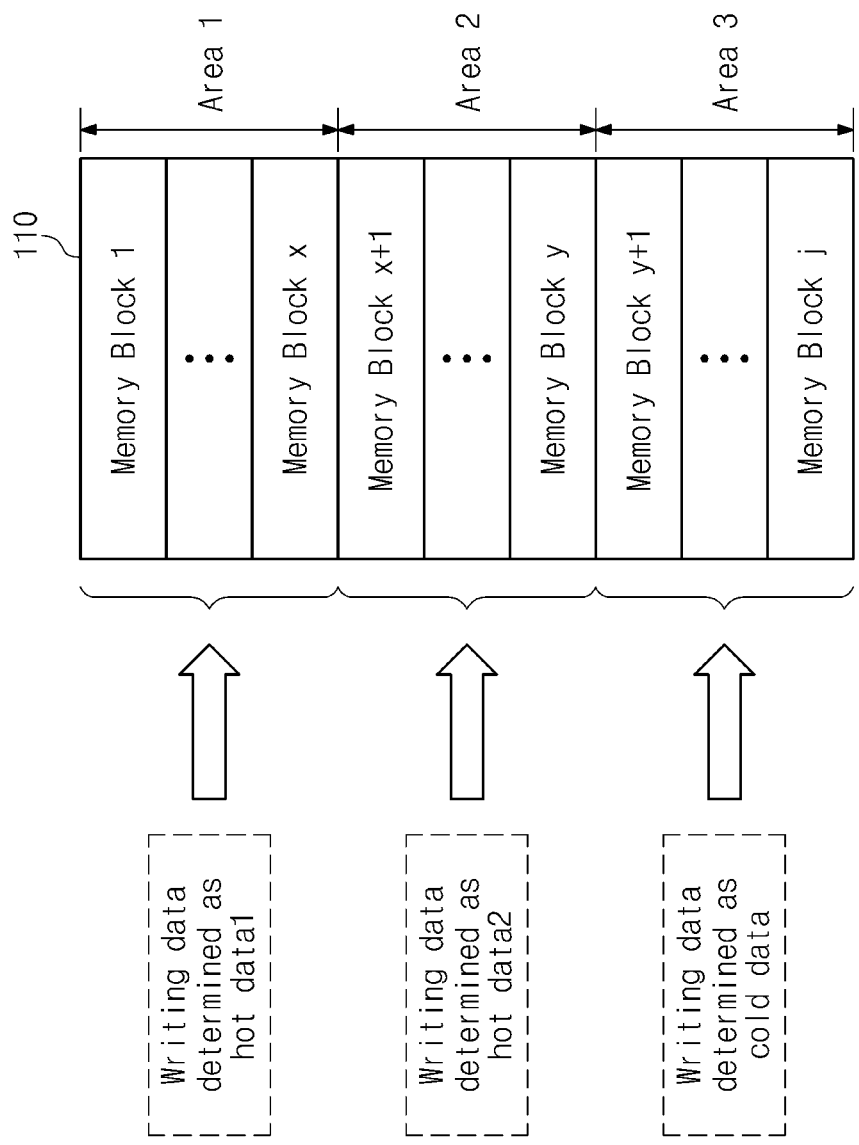
FIG. 13 is a diagram for describing a method of storing writing data in a nonvolatile memory according to an address type judged in FIG. 12.

FIG. 12 is a flowchart for describing a method of judging a type of a logical block address input from a host in FIG. 8. FIG. 13 is a diagram for describing a method of storing writing data in a nonvolatile memory according to an address type judged in FIG. 12. In FIG. 13, there is exemplarily illustrated a nonvolatile memory 110 including a first, a second, and a third area Area1, Area2, and Area3.

Referring to FIGS. 8, 12, and 13, in operation S410, a processing unit 222 judges whether a logical block address LBA input from a host coincides with at least one logical block address in a second hot address table 253. Operations S420 and S430 are selectively performed according to the judgment.

In operation S420, if the logical block address LBA input from the host coincides with at least one logical block address in the second hot address table 253, the processing unit 222 determines the input logical block address LBA as a first hot address. In this case, writing data WD input with the logical block address LBA may be first hot data. In operation S430, the writing data WD is stored in a first area Area1 of a nonvolatile memory 110.

In operation S440, the processing unit 222 judges whether the logical block address LBA input from the host coincides with at least one logical block address in a first hot address table 252. If the logical block address LBA input from the host coincides with at least one logical block address in a first hot address table 252, the method proceeds to operation S450. If the logical block address LBA input from the host does not coincide with at least one logical block address in a first hot address table 252, the method proceeds to operation S470.

In operation S450, the processing unit 222 determines the input logical block address LBA as a second hot address. In this case, writing data WD input with the logical block address LBA may be second hot data. The second hot address means a logical block address which is accessed relatively frequently by a host as compared with the first hot address. The second hot data means writing data which is updated relatively frequently as compared with the first hot data. In operation S460, the writing data WD is stored in a second area Area2 of the nonvolatile memory 110.

In operation S470, the processing unit 222 determines the input logical block address LBA as a cold address. Writing data WD input with the logical block address LBA may be cold data. In operation S480, the writing data WD is stored in a third area Area3 of the nonvolatile memory 110.

As described with reference to FIGS. 12 and 13, a logical block address LBA input from a host may be determined as a cold address, a first hot address, or a second hot address based upon the first and second hot address tables 252 and 253. However, the inventive concept is not limited thereto. Exemplarily, a logical block address LBA input from a host may be determined as a cold address or a hot address. For example, a logical block address LBA input from a host may be determined as a cold address or a hot address according to logical block addresses in the second hot address table 253. In this case, writing data input with the logical block address LBA is stored in one of the first and second areas Area1 and Area2 (refer to FIG. 7).

Figure 14:
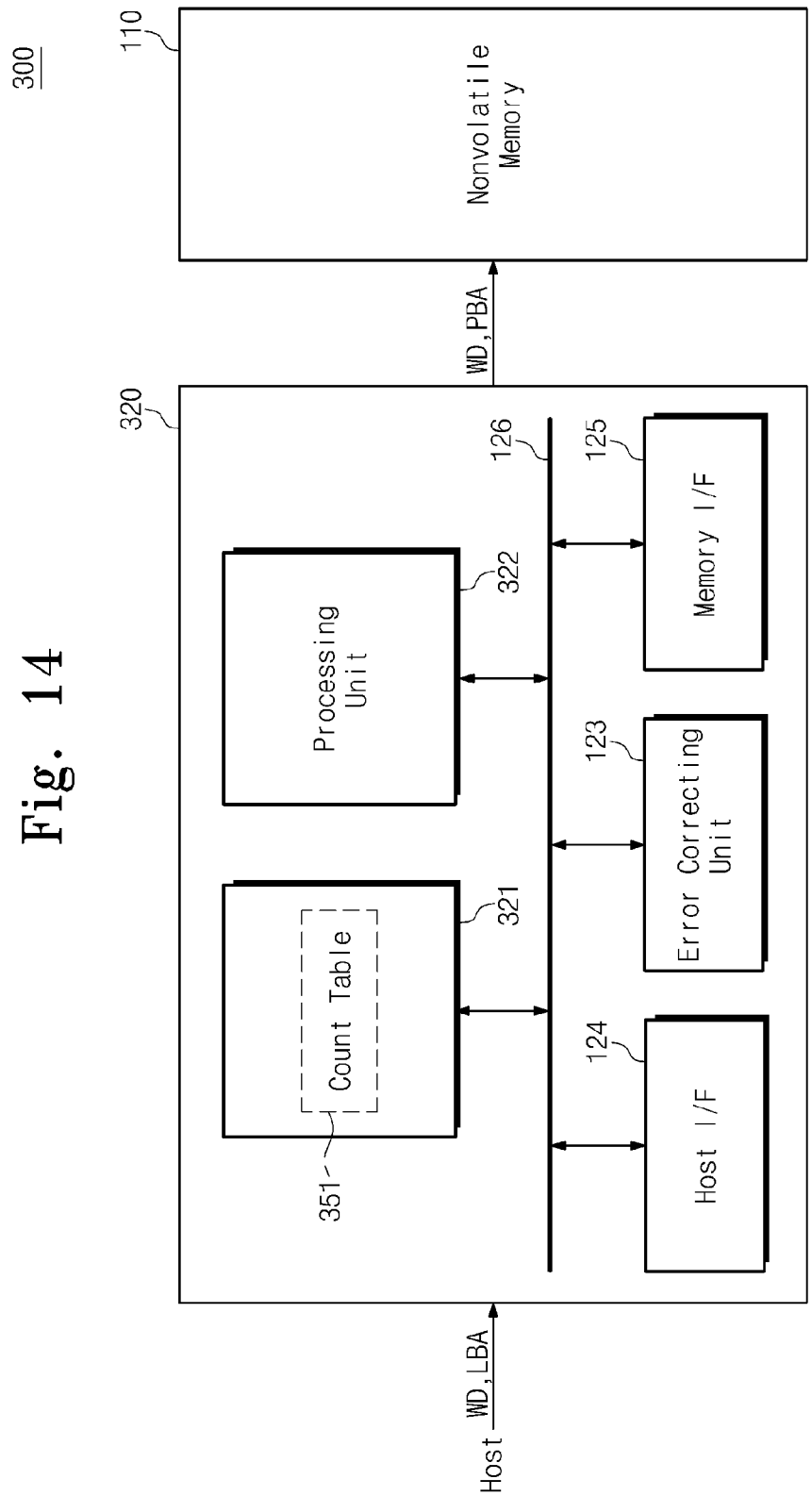
FIG. 14 is a block diagram illustrating a memory system according to still another exemplary embodiment of the present general inventive concept.

FIG. 14 is a block diagram illustrating a memory system according to still another exemplary embodiment of the inventive concept. A nonvolatile memory 110 in FIG. 14 is identical to that in FIG. 1. A memory controller 320 in FIG. 14 is identical to that in FIG. 1 except for a processing unit 322 and a buffer unit 321, and therefore the identical description has been omitted.

The buffer unit 351 stores a count table 351. A space of logical block addresses capable of being received from a host may be divided into a plurality of address groups. The count table 351 stores count values corresponding to the plurality of address groups, respectively.

At a write operation, the processing unit 322 searches an address group in the count table 351 including a logical block address LBA input from a host. The processing unit 322 judges a type of a logical block address LBA (e.g., a hot address or a cold address) by comparing a count value corresponding to the searched address group with a threshold count value. The processing unit 322 generates a physical block address PBA according to the judgment. Writing data WD input with the logical block address LBA is stored in an area corresponding to the physical block address PBA of the nonvolatile memory 110.

Figure 15:
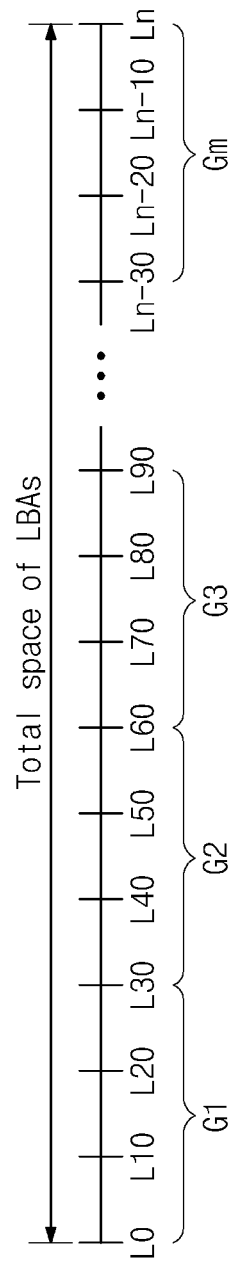
FIG. 15 is a diagram illustrating a total space of logical block addresses divided into a plurality of address groups.

FIG. 15 is a diagram illustrating a total space of logical block addresses divided into a plurality of address groups. Referring to FIG. 15, a total space of logical block addresses capable of being received from a host may be formed of a first logical block L1 to an nth logical block address Ln. The first to nth logical block addresses L1 to Ln are divided into address groups G1 to Gm. In this embodiment, dividing of a total space of logical block addresses into plural address groups can be accomplished by partitioning the total space of logical block addresses capable of being received from the host by one percent.

FIG. 16 is a diagram illustrating a count table in FIG. 14. Referring to FIG. 16, a count table 351 stores count values VALUE1 to VALUEm corresponding to a plurality of address groups G1 to Gm, respectively. The count table 351 further stores a total count value TVAL being a sum of the count values VALUE1 to VALUEm.

Whenever a logical block address LBA is received, the processing unit 322 controls a buffer unit 321 such that a count value of an address group including the input logical block address LBA increases. For example, when a logical block address L9 is received, the processing unit 322 controls the buffer unit 321 such that a count value VALUE1 of an address group G1 (refer to FIG. 15) including the input logical block address L9 increases.

At a write operation, the processing unit 322 searches an address group, including a logical block address LBA input from a host, among a plurality of address groups. If a count value of the searched address group is more than a threshold count value, the processing unit 322 judges the input logical block address LBA to be a hot address. If a count value of the searched address group is less than a threshold count value, the processing unit 322 judges the input logical block address LBA to be a cold address.

In this exemplary embodiment of the present general inventive concept, the processing unit 322 determines the threshold count value according to a total count value TVAL. For example, the threshold count value increases in proportion to an increase in the total count value TVAL. In this exemplary embodiment, the processing unit 322 initializes the count table 351 when the total count value TVAL reaches the threshold count value. At this time, the threshold count value is fixed.

Figure 17:
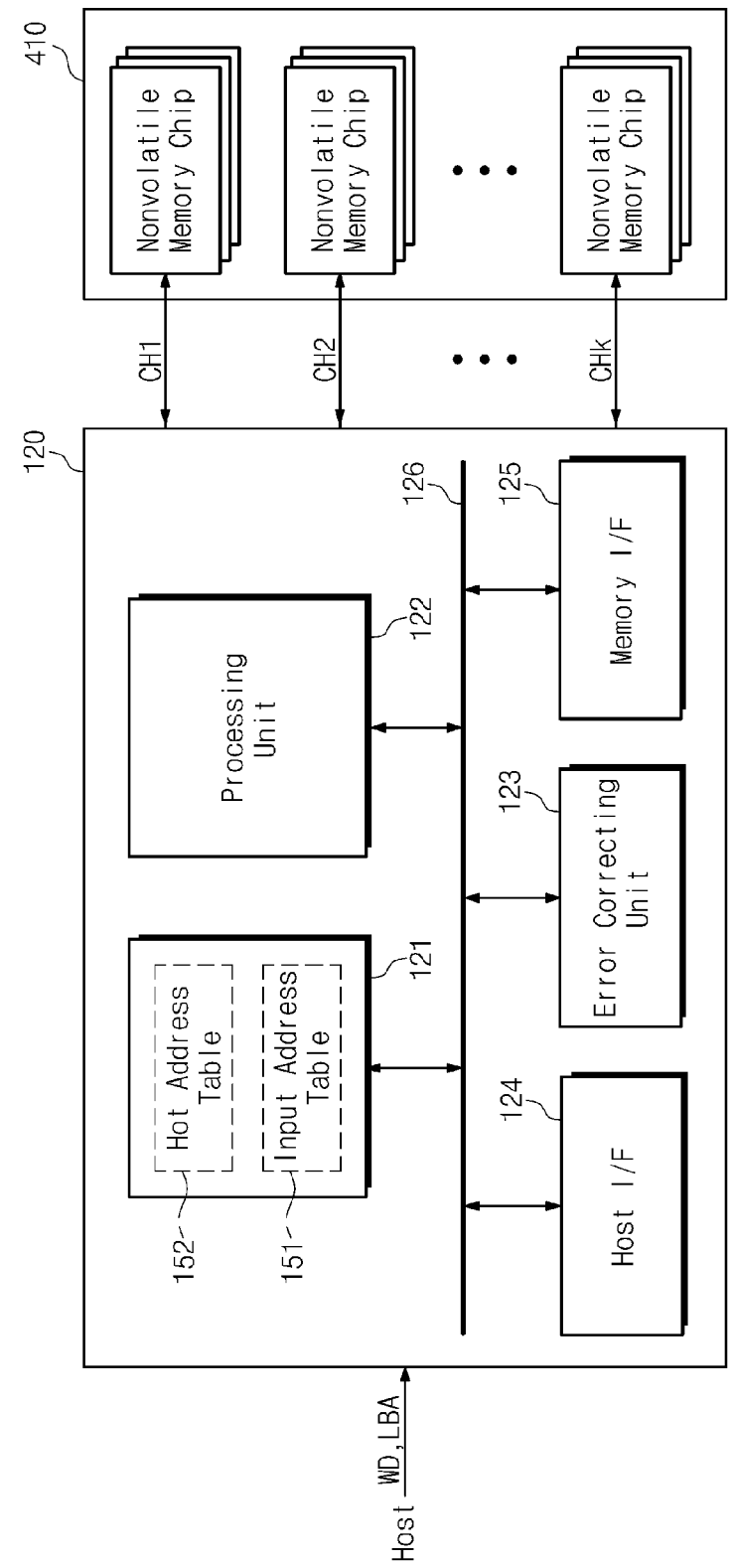
FIG. 17 is a block diagram illustrating an application of a memory system in FIG. 1.

FIG. 17 is a block diagram illustrating an application of a memory system in FIG. 1. Referring to FIG. 17, a memory system 400 includes a nonvolatile memory part 410 and a memory controller 120. The nonvolatile memory part 410 includes a plurality of nonvolatile memory chips. The plurality of nonvolatile memory chips may be divided into a plurality of groups. A plurality of nonvolatile memory chips in each group is configured to communicate with the memory controller 120 via a common channel. In this exemplary embodiment of the present general inventive concept, the plurality of nonvolatile memory chips may communicate with the memory controller 120 via a first channel CH1 to a kth channel CHk.

The plurality of nonvolatile memory chips may have the same structure as a nonvolatile memory in FIG. 7 or 13, and description thereof is thus omitted.

The memory controller 120 is substantially identical to that described in FIG. 1. That is, the memory controller 120 translates a logical block address LBA into a physical block address. The physical block address may be determined based upon logical block addresses stored in a hot address table 152. Writing data may be stored in nonvolatile memory chips according to the physical block address.

In FIG. 17, there is exemplarily illustrated the case that a plurality of nonvolatile memory chips is connected with one channel. However, the memory system 400 can be modified such that a nonvolatile memory chip is connected with a channel.

Figure 18:
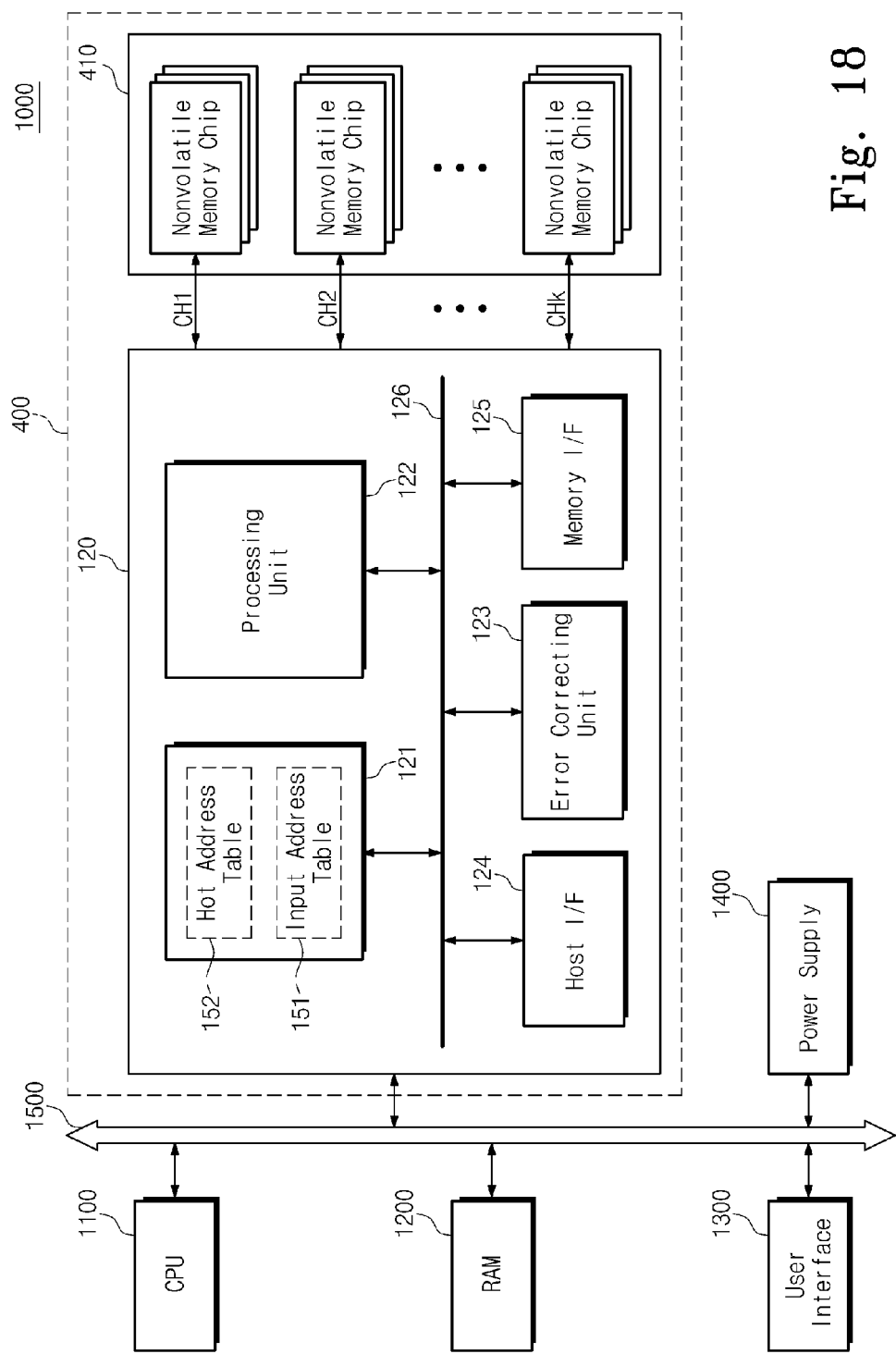
FIG. 18 is a block diagram illustrating a computing system including a memory system in FIG. 17.

FIG. 18 is a block diagram illustrating a computing system including a memory system in FIG. 17. Referring to FIG. 18, a computing system 1000 includes a CPU 1100, a RAM 1200, a user interface 1300, a power supply 1400, a system bus 1500, and a memory system 400.

The memory system is electrically connected with the CPU 1100, the RAM 1200, the user interface 1300, and the power supply 1400 via a system bus 1500. Data provided via the user interface 1300 or processed by the CPU 1100 is stored in the memory system 400.

In FIG. 18, exemplarily illustrated is the case where a nonvolatile memory 410 is connected with the system bus 1500 via a memory controller 120. However, the nonvolatile memory 410 can be connected directly to the system bus 1500. In this case, a function of a processing unit 122 may be executed by the CPU 1100. Further, a function of a buffer unit 121 may be executed by the RAM 1200.

In FIG. 18, the memory system 400 described with reference to FIG. 17 can be replaced with a memory system 100 described with reference to FIG. 1.

In this embodiment, the computing system 1000 may be configured to include all of memory systems 100 and 400 described in FIGS. 1 and 17.

The memory controller 120 according to an exemplary embodiment of the present general inventive concept may determine a logical block address LBA input from a host as a hot or cold address according to a hot address table 151, while not referencing an input address table 151. Accordingly, the memory controller 120 may determine a hot or cold address considering a tendency of a logical block address LBA input at each write operation.

The memory controller 120 according to an exemplary embodiment of the present general inventive concept may include a buffer unit 321 which stores count values corresponding to address groups and not count values corresponding to addresses. Accordingly, it is possible to provide the memory controller 120 configured such that a capacity for storing count values is reduced.

Although a few embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A memory controller interfacing with a host and a nonvolatile memory, comprising:
    a buffer unit configured to store an input address table and a first hot address table; and
    a processing unit configured to judge whether an address from the host coincides with an address stored in the input address table and to store the address from the host in the first hot address table according to the judgment, the processing unit storing the address from the host in the input address table according to a first-in first-out (FIFO) manner,
    wherein the buffer unit further includes a second hot address table,
    wherein the processing unit stores the address from the host in the second hot address table when the address from the host coincides with at least one address stored in the first hot address table, wherein the processing unit determines a type of the address from the host based upon the first and second hot address tables,
    wherein if the address from the host coincides with at least one address stored in the second hot address table, the processing unit determines the type of the address from the host by determining whether the address from the host is a first hot address,
    wherein if the address from the host coincides with at least one address stored in the first hot address table while not coinciding with at least one address stored in the second hot address table, the processing unit determines the type of the address from the host by determining the address from the host as a second hot address, and
    wherein if the address from the host does not coincide with at least one address stored in either of the first and second hot address tables, the processing unit determines the type of the address from the host by determining the address from the host as a cold address.

2. The memory controller of claim 1, wherein the processing unit determines a type of the address from the host by determining whether the address from the host is a hot address or a cold address according to addresses stored in the first hot address table.

3. The memory controller of claim 2, wherein the nonvolatile memory includes a first area and a second area, and
    wherein the processing unit controls the nonvolatile memory such that writing data input with the address from the host is selectively stored in the first and second areas according to whether the address from the host is a hot address or a cold address.

4. The memory controller of claim 2, wherein the nonvolatile memory includes a first area and a second area,
    wherein the processing unit generates a physical block address corresponding to one of the first and second areas according to whether the address from the host is a hot address or a cold address, and
    wherein writing data input with the address from the host is stored in one of the first and second areas according to the physical block address.

5. The memory controller of claim 1, wherein if the address from the host coincides with at least one address stored in the input address table, the processing unit judges whether the address from the host coincides with at least one address stored in the first hot address table.

6. The memory controller of claim 1, wherein the nonvolatile memory includes a first area and a second area,
    wherein the processing unit determines the address from the host as a hot address or a cold address according to addresses stored in the second hot address table, and
    wherein the processing unit controls the nonvolatile memory such that writing data input with the address from the host is selectively stored in the first and second areas according to the determination.

7. The memory controller of claim 1, wherein the nonvolatile memory includes a first, second and third areas, and wherein the processing unit controls the nonvolatile memory such that writing data input with the address from the host is selectively stored in the first, second and third areas according to the type of the address from the host.

8. A memory controller interfacing with a host and a nonvolatile memory, comprising:
- a buffer unit configured to store an address table;
- a processing unit configured to categorize an address received from the host and to store the categorized address in the address table based on the categorization of the received address,
- wherein the address table of the buffer unit includes an input address table and a first hot address table, the received address being stored only in the input address table or both the input address table and the first hot address table based on the categorization of the received address by the processing unit,
- wherein the address table of the buffer unit further includes a second hot address table, the received address being stored in: (1) only the input address table, (2) the input address table and the first hot address table, or (3) the input address table, the first hot address table and the second hot address table, based on the categorization of the received address by the processing unit, and
- wherein the processing unit categorizes the received address as a cold address, a first hot address, or a second hot address, the received address being categorized as a cold address if the received address does not coincide with an address stored in the input address table, the received address being categorized as a first hot address if the received address coincides with an address stored in the input address table, and the received address being categorized as a second hot address if the received address coincides with an address stored in both the input address table and the first hot address table.

9. The memory controller of claim 8, wherein the processing unit categorizes the received address as a cold address or a hot address, the received address being categorized as a hot address if the received address coincides with an address stored in the input address table, and the received address being categorized as a cold address if the received address does not coincide with an address stored in the input address table.

10. The memory controller of claim 9, wherein the nonvolatile memory includes a first area and a second area, and writing data input with the received address is selectively stored in the first and second areas according to the categorization of the received address by the processing unit.

11. The memory controller of claim 8, wherein the nonvolatile memory includes a first area, a second area and a third area, the writing data input with the received address is selectively stored in the first, second and third areas according to the categorization of the received address by the processing unit.

* * * * *